United States Patent Office 3,838,080
Patented Sept. 24, 1974

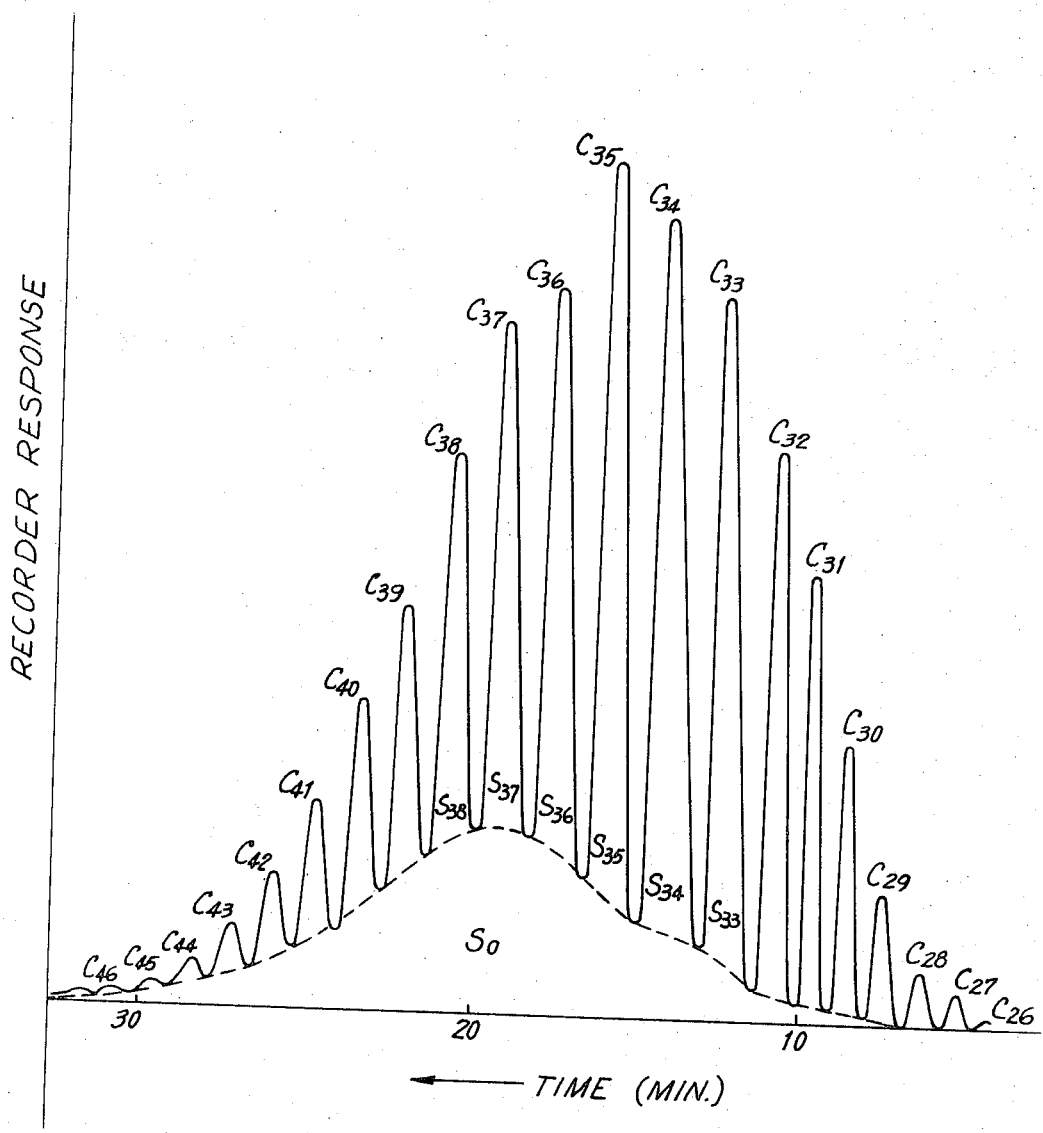

3,838,080
WAXY COMPOSITION FOR PREVENTING
RUBBERY SUBSTANCE FROM OZONE
DETERIORATION
Toshihiko Shinomura, 2847 Kamiyabe-cho, Totsuka-ku, Yokohama, Japan, and Hiroshi Uemura, 1635 Takagasaka, Machida, Japan
No Drawing. Filed Dec. 27, 1971, Ser. No. 212,635
Claims priority, application Japan, Dec. 28, 1970, 46/119,997
Int. Cl. C08f 45/52; C08h 9/06
U.S. Cl. 260—28.5 B                4 Claims

ABSTRACT OF THE DISCLOSURE

A waxy composition containing 40 percent or more by weight of normal chain hydrocarbons having from 34 to 40 carbon atoms, a method of utilizing said waxy composition for preventing rubbery substance from ozone deterioration, and a rubbery article thus prevented from ozone deterioration. The method comprises steps of mixing said waxy composition with raw rubber, subsequently vulcanizing the mixture, and leaving the vulcanized matter as it is for letting the waxy composition bloom on the surface of the matter. Results of some tests are disclosed.

BACKGROUND OF THE INVENTION

This invention relates to new and useful improvements in the prevention of ozone deterioration for the rubbery substance and more particularly to a waxy composition for preventing rubbery substance from ozone deterioration, a method of utilizing the waxy composition of the class described, and a rubbery article thus prevented from ozone deterioration.

Heretofore, it has been known that strained rubber substance is affected by a slight amount of ozone in air so as to be deteriorated, and cracks occur therein.

There are methods for preventing the ozone deteriorations, which are generally classified into two. One is a method of adding particular aromatic diamine derivative or the like, so-called antioxidant. The other is a method of adding petroleum wax. In accordance with the former method, the antioxidant brought in the rubbery substance reacts with ozone so as to prevent the rubbery substance from ozone deterioration. In accordance with the latter method, in which wax is used, the wax blooms on the surface of the rubbery substance with the lapse of time so as to form a coating phase, whereby attack of ozone against the rubbery substance is prevented. In the latter method, a physical action as above is thus utilized. Of course, it is possible to concurrently use these two methods. However, the method of using wax is inexpensive, and, in addition, advantageous in that coloring does not occur thereby.

Heretofore, as the wax of the class described, so-called high melting point petroleum paraffin wax or petroleum microcrystalline wax, having a melting point of a matter of from 63 to 83° C. as indicated in the JIS K 2521 has been used. However, the inventors of this invention have found that performances of these waxes for preventing the ozone deterioration are not satisfactory, respectively, and studied the matter, resulting in this invention.

The primary object of this invention is to provide a waxy composition having a performance for extremely highly preventing ozone deterioration.

Another object of this invention is to provide a method of using the waxy composition for preventing rubbery substance from ozone deterioration.

Still another object of this invention is to provide rubbery articles thus prevented from ozone deterioration.

SUMMARY OF THE INVENTION

It has now been discovered surprisingly that a waxy composition containing 40 percent or more by weight of normal chain hydrocarbons having from 34 to 40 carbon atoms is critically satisfactory for preventing rubbery substance from ozone deterioration.

The discovery results from zeolous study of the ozone deterioration preventing mechanism of wax for rubber done by the present inventors of this invention. As a result of the study, they have found an important fact. In view thereof, it has been found that all of the now available ozone deterioration preventing waxes have compositions appreciably deviating from the optimum composition, respectively. Under these circumstances, they produced the optimum composition and studied the same. As a result of the study, it has been found that their product has performance which is distinguishably superior to those of the now available ozone deterioration preventing waxes.

At first, the following surprising fact was found. Wax was blended with rubber. The blend was vulcanized and left as it was at a room temperature. Then the wax bloomed on the surface of the rubber sheet to form a wax phase which protects the rubber sheet from attack of ozone. The wax was fractionated during it was diffused in the rubber and separated onto the surface of the sheet, so that the composition of wax separated onto the surface of the sheet of rubber consisted of such fractions as having extremely limited numbers of or about 30 to 40 carbon atoms, even if the originally used wax had whatever composition. It has been found that the range of the number of carbon atoms is affected by kind of rubbery substance, blending amount of wax, the condition for leaving, and the like, more or less, but not by kind of the wax. This fact was found by scraping up wax bloomed on the surface of the rubber sheet carefully and analyzing it.

The mechanism for the fractionation phenomenon that the separated components of the wax onto the surface of rubber sheets have limited numbers of carbon atoms only is understood as follows: Low molecular weight wax components having less than about 30 carbon atoms are not separated onto the surface of rubber because they are mutually molecularly dissolved with rubber. On the other hand, high molecular weight wax components having more than about 40 carbon atoms have slow diffusing velocities, and therefore, they are isolated inside rubber but not separated onto the surface thereof. Such components as having about 30 to 40 carbon atoms only, which satisfy the requirements in both compatibility and diffusing velocity, are separated onto the surface of rubber. This is the inventors' knowledge.

The present inventors have found further another fact. That is, such components of wax separated but as having from 30 to 33 carbon atoms are not able to elaborately coat the surface of the rubber sheet because they form a phase of rough, discontinuous crystals on the surface, so that performance of these components for preventing the ozone deterioration is extremely inferior, as illustrated in the after-mentioned embodiments.

Furthermore it has been also found that a branched chain hydrocarbon component of the wax is not effective for preventing the ozone deterioration.

In view of the above facts, the present inventors have found that normal chain hydrocarbons having from 34 to 40 carbon atoms are extremely effective for preventing the ozone deterioration so as to complete this invention.

In accordance with this invention, a waxy composition containing more than 40 percent by weight of normal chain hydrocarbons having from 34 to 40 carbon atoms is useable. It is unnecessary and improper that hydrocarbons having less than 34 and more than 40 carbon atoms are mixed within the composition in accordance with this invention, and substantial absence thereof is preferred. However, such a composition having more than 40 percent by weight of normal chain hydrocarbons having 34 to 40 carbon atoms is capable of having sufficiently superior performance.

The production of the composition in accordance with this invention is not limited to a particular process. It is possible to produce a desired product by, for example, removing the light weight components and heavy weight components from heretofore well known petroleum wax by distillation.

Petroleum wax may be obtained by the following process. Crude oil is distilled under the ordinary pressure, yielding tower bottom oil, which is further distilled under a reduced pressure, yielding a fraction, from which aromatic components are removed by the solvent extraction using phenol, furfural, or the like. The residue is, preferably after being hydrofinished, further solvent-dewaxed with ketone, an aromatic mixed solvent, or the like, yielding dewaxed oil as a basic oil for a lubricating oil. As a by-product from the dewaxing step, crude wax is obtained. The crude wax is further deoiled by solvent, removing low fraction therefrom and yielding deoiled wax. Alternatively, the crude wax may be deoiled by the sweating process, yielding deoiled wax. The deoiled wax may be further purified by treating it with sulphuric acid, clay, or the like.

Although the desired wax composition in accordance with this invention may be obtained by distilling deoiled wax obtained by the usual process as above, it is preferred that, by selecting crude oil, which is the starting material, or when the fraction is obtained by distilling under a reduced pressure the tower bottom oil, which is the residue of distillation under the ordinary pressure, a narrow cut distillation is carried out so that the fraction substantially consists of hydrocarbons having from 34 to 40 carbon atoms.

Furthermore, as the wax composition in accordance with this invention, polyolefins obtained by the polymerization of olefins such as ethylene and the like, the thermal cracking products of polyolefins, waxes synthesized by the Fischer-Tropsch process, and compositions obtained from the polyolefins, thermal cracking products, and synthesized waxes, as above, by subjecting thereto the distillation, extraction, and the like so that the composition has the required number of carbon atoms, may be used. The number of carbon atoms of the wax composition may be quantitatively studied by the temperature-elevating gas chromatography as described in the Example 1 referred to hereinafter.

BRIEF DESCRIPTION OF THE DRAWING

The accompanying drawing represents an example of chart for the method of calculating quantities of components contained in the waxy composition in accordance with this invention, which is, for example, the produced sample H described in the Example 1.

DESCRIPTION OF THE PREFERRED EMBODIMENT

Now this invention will be more concretely explained in the following examples.

Example 1

Produced samples F, H, I, J and K were various kinds of petroleum waxes obtained from crude waxes, and by-products of basic oil production for petroleum lubricating oils. Produced samples G and L were otherwise yielded. These produced samples were blended in styrene-butadiene rubber 1712 together with various other vulcanizing agents as the following blending recipe. The blend was vulcanized to obtain pieces of the rubber sheets, which were then fixed to various elongations and subjected to the ozone deterioration test, where the ozone deterioration preventing performance was searched by measuring the critical strain. Table 1 shows the results of the search, where those for marketed waxes, that is, marketings A, B, C, D and E, are united.

The blending recipe and the vulcanizing condition for the above production of the rubber sheets were as follows:

| Blending recipe | | Vulcanizing condition |
|---|---|---|
| Rubber | 100 | 150° C. |
| Zinc white | 8 | 30 min. |
| Stearic acid | 1 | |
| High abrasion furnace black | 40 | |
| Vulcanization accelerator CZ | 1 | |
| Sulphur | 2 | |
| Wax | 2 | |

As clearly shown from the results of the search, it is to be seen that, in case the wax composition in accordance with this invention is used, the ozone deterioration preventing performance is extremely excellent. The marketed waxes illustrated for comparison have low critical strains and inferior ozone deterioration preventing performance, respectively.

Furthermore, the blooms formed on the surfaces of the rubber sheet by these produced samples and marketings were studied by the instrumentality of the electron microscope. By these studies, elaborateness of the coatings formed by the blooms on the surfaces were observed. Photographic prints by the scanning electron microscopic photography of the coatings formed by the marketings A and B and the produced samples G, H and K were made for disclosure in connection with this application.

TABLE 1

Ozone deterioration preventing performance regarding compositions of various waxes

| Waxes | Composition of wax, percent | | | | | Ozone deterioration preventing performance [1] | Critical strain [2] |
|---|---|---|---|---|---|---|---|
| | Branched | $nC_{29}$ or less | $nC_{30}$–$nC_{33}$ | $nC_{34}$–$nC_{40}$ | $nC_{41}$ or more | | |
| Compared samples: | | | | | | | |
| Marketing A | 26.3 | 27.9 | 18.9 | 26.6 | 0.3 | Wrong | 10 or less. |
| Marketing B | 23.1 | 27.2 | 27.4 | 22.3 | 0.4 | do | Do. |
| Marketing C | 29.6 | 29.1 | 29.9 | 11.2 | 0.2 | do | Do. |
| Marketing D | 16.7 | 19.6 | 47.6 | 15.9 | 0.2 | do | Do. |
| Marketing E | 35.6 | 5.8 | 22.0 | 32.2 | 4.4 | Ordinary | 15. |
| Produced sample F | 0 | 0 | 100.0 | Trace | 0 | Wrong | 10 or less. |
| Produced sample G [3] | Trace | 40.8 | 11.9 | 16.4 | 30.9 | do | Do. |
| Example 1: | | | | | | | |
| Produced sample H | 31.2 | 1.5 | 19.2 | 44.2 | 3.9 | Excellence | 25. |
| Produced sample I | 24.5 | 0 | 8.4 | 64.5 | 2.6 | do | 40. |
| Produced sample J | 20.4 | 0 | 4.1 | 73.4 | 2.1 | do | 55. |
| Produced sample K | 0 | 0 | Trace | 100.0 | 0 | do | 65. |
| Produced sample L [4] | Trace | 3.7 | 21.3 | 49.4 | 25.6 | do | 35. |

[1] The ozone deterioration preventing performance is judged by the state of cracks formed on samples elongated and fixed to various static strains and exposed in an atmosphere having an ozone concentration of 50 p.p.h.m. at a temperature of 50° C. for 5 hours (in conformity to the JIS K 6301 of 1969).

[2] The critical strain means the minimum static strain, whereby a crack occurs in process of the ozone deterioration test conditional on the above. It is deemed that, the larger the critical strain, the more excellent the ozone deterioration preventing performance is.

[3] The produced sample G was a wax (of a low molecular weight polyethylene) produced by polymerizing ethylene.

[4] The produced sample L was a cut obtained by distilling the produced sample G.

The composition of the produced sample, for example, H was quantitatively studied. For the measurement, a chart as the accompanying drawing was obtained by the temperature-elevating gas chromatographic method, in which a column (3 mm. $\phi$ x 1 m.) of a carrier of Chromosolv G (60–80 mesh) and liquid phase of silicone SE–52.3% were used at a temperature-elevating velocity of 4° C./min. The content of a normal chain hydrocarbon in the sample may be given by the equation $$\text{n-C}_n\text{wt. percent} = 100 \times S_n \bigg/ \bigg(S_o + \sum_1 S_i\bigg) \quad (1).$$

wherein So and Sn represent the areas indicated in the chart, and therefore, the waxy composition in accordance with this invention is to have such a composition as to satisfy the following equation $$\sum_{n=34}^{40} \text{n-C}_n\text{wt. percent} = 100 \times \sum_{n=34}^{40} S_n \bigg/ \bigg(S_o + \sum_1 S_i\bigg) \geq 40 \quad (2).$$

Meantime, if branched chain hydrocarbons exist in the sample, the content thereof may be given by the equation $$\text{branched n-C}_n\text{wt. percent} = 100 \times S_o \bigg/ \bigg(S_o + \sum_1 S_i\bigg) \quad (3).$$

Example 2

The produced sample H and the produced sample I were blended in various rubbers together with vulcanizing agents similarly to the Example 1 and vulcanized, yielding pieces of rubber sheets, which were tested in connection with the ozone deterioration preventing performance. The Table 2 shows the results of the test, which shows excellence of the tested samples

TABLE 2

Ozone deterioration preventing performance of the produced samples in various rubbers

| Waxes | Rubbers, the object of the test | Ozone deterioration preventing performance [1] | |
|---|---|---|---|
| | | $\gamma=10\%$ | $\gamma=20\%$ |
| Produced: | | | |
| Sample H. | Solution polymerization polybutadiene rubber, oil extended (JSR BR 31) (Hi-Aromatic oil 37.5 phr. ML1+4, 100° C.=35). | No crack occurs. | No crack occurs. |
| Sample I. | Solution polymerization styrene-butadiene rubber, oil extended (Tufdene 1530) (Styrene content 18% Hi-Aromatic oil 37.5 phr. ML1+4, 100° C.=37). | ....do..... | Do. |
| Sample H. | Solution polymerization styrene-butadiene rubber, oil extended (Alfin rubber) (Styrene content 15% Hi-Aromatic oil 37.5 phr. ML1+4, 100° C.=40). | ....do..... | Do. |

[1] Denotes static strain.

The test of the Example 2 was done similarly to that of the Example 1 in connection with the blending recipe, vulcanizing condition, and conditions for the ozone deterioration test.

Example 3

A wax was divided into two produced samples or two components, one component containing the major of branched chain hydrocarbons and the other component containing the major of normal chain hydrocarbons, by means of the urea adduct purification. The divided components were subjected to the ozone deterioration test, yielding the results as shown in Table 3. It is to be seen therefrom that the branched chain component is inferior in the ozone deterioration preventing performance.

TABLE 3

Merits of the branched chain component vs. the normal chain component in the ozone deterioration preventing performance

| Waxes | Composition [2] | | Ozone deterioration preventing performance [3] |
|---|---|---|---|
| | Branched chain components (wt. percent) | Normal Chain components (wt. percent) | |
| Produced: | | | |
| Sample Mn[1] | 31.5 | 68.5 | No crack occurs. |
| Sample Mi[1] | 87.3 | 12.7 | C-2. |

[1] The produced sample M was divided into the produced sample (Mi) containing the major of branched chain components and the produced sample (Mn) containing the major of normal chain components by means of the urea adduct purification.
[2] Contents of the branched chain components and the normal chain components are given hereinbefore.
[3] The Example 3 was carried out similarly to the Example 1 for the material, styrene-butadiene rubber 1712, and the conditions of the blending, vulcanization and the ozone exposure, and with a static strain of 20%. The ozone deterioration preventing performance was evaluated by the JIS K 6301 of 1969.

In the Example 3, a produced sample M of wax was used, which was a petroleum wax containing from 27 to 46 carbon atoms and about 57 percent by weight of the normal chain components and about 43 percent by weight of the branched chain components.

It is to be understood that the above particular description is by way of illustration and that changes, omissions, additions, substitutions, and/or modifications might be made within the scope of the claims without departing from the spirit of the invention which is intended to be limited only as required by the prior art.

What is claimed as new and desired to be secured by Letters Patent of the United States is:

1. A method of preventing rubbery substance from ozone deterioration, comprising steps of mixing a waxy composition with raw rubbery substance selected from the group consisting of butadiene rubber and styrene-butadiene rubber, said waxy composition containing at least 40 percent by weight of normal chain hydrocarbons having from 34 to 40 carbon atoms, the remainder consisting essentially of straight chain hydrocarbons having a number of carbon atoms outside the stated range and branched chain hydrocarbons, and being essentially free of microcrystalline wax and compounds other than aliphatic hydrocarbons, subsequently vulcanizing said mixture, and leaving said vulcanized mixture as it is for letting said waxy composition bloom on the surface of said vulcanized mixture.

2. The method of claim 1 wherein the quantity of said waxy composition added to said rubbery substance is such that the solubility of said normal chain hydrocarbons having 34 to 40 carbon atoms in said rubbery substance subsequent to vulcanization is exceeded by an amount sufficient to form a substantially continuous film of said normal chain hydrocarbons on the surface of said substance after vulcanization.

3. The method of preventing rubbery substance from ozone deterioration as defined in claim 1, wherein said rubbery substance contains about 65% by weight of rubber and the quantity of said waxy composition added to said rubbery substance is about 2% based on the quantity of rubber in said rubbery substance.

4. The method of preventing rubbery substance from ozone deterioration as defined in claim 3, wherein said rubber is selected from the group consisting of styrene-butadiene rubber, oil-extended, solution-polymerized polybutadiene rubber and oil-extended, solution-polymerized styrene-butadiene rubber having a styrene content of 18%.

References Cited

UNITED STATES PATENTS

| | | | |
|---|---|---|---|
| 3,530,076 | 9/1970 | Sparks et al. | 260—28.5 B |
| 3,244,666 | 4/1966 | Sharpe | 260—28.5 B |

OTHER REFERENCES

Rubber Chemistry & Technology, Ferris et al., Vol. 32: 379-393, 1959.

Rubber Age, November 1961, p. 289.

ALLAN LIEBERMAN, Primary Examiner

S. L. FOX, Assistant Examiner

U.S. Cl. X.R.

106—270